3,001,961
WATER DISPERSIBLE OIL MODIFIED ALKYD RESINS CONTAINING OXYALKYLATED GLYCOLS AND METHOD OF MANUFACTURE OF THE SAME
Frank Armitage, Chingford, London, and Leslie George Trace, Leigh-on-Sea, England, assignors, by mesne assignments, to The Sherwin-Williams Company, Cleveland, Ohio, a corporation of Ohio
No Drawing. Filed July 12, 1956, Ser. No. 597,326
Claims priority, application Great Britain July 15, 1955
12 Claims. (Cl. 260—22)

This invention is for improvements in or relating to the manufacture of alkyd resins and has for an object to provide a process for the production of water-dispersible alkyd resins which find a use in the production of water-based paints including those capable of providing a gloss finish.

The production of satisfactory gloss emulsion paints has provided a difficult problem for paint chemists and although there have been a number of prior proposals and although a number of gloss emulsion paints have been marketed, the water-resistance of the products has, in general, been less than is desirable.

The present invention has for an object to provide a water-dispersible alkyd resin which will be suitable as a base medium in the production of water-based paints without the necessity of using a protective colloid. The advantages of water-based paints over the conventional paints based on a volatile organic solvent are that the fire hazard is reduced, the products are substantially odourless and are often cheaper, they are easier to apply and may be thinned merely by the addition of water and, furthermore, brushes and other utensils may be cleaned with water, thus avoiding the use of solvents. Conventional emulsion paints, however, are stabilized with a protective colloid such as glue, casein, gum arabic, polyvinyl alcohol, starch or cellulose derivatives, all of which are more or less susceptible to microbe and fungus attack, and being water-sensitive reduce the water-resistance and outside durability of paints based on such emulsions. These disadvantages are eliminated in the present invention. Moreover, the absence of a stabilizer renders the production of glossy paints much easier.

We are aware of a proposal in prior United States specification No. 2,634,245 to produce a water-dispersible alkyd resin by reacting a polyethylene glycol with a preformed resin which may be an oil-modified alkyd resin. We have carried out experiments in accordance with the disclosure of this prior specification and although in some instances water-dispersible resins were in fact produced, their film-forming properties were not entirely satisfactory and the products made with the use of the higher molecular weight polyethylene glycols e.g. those of molecular weight above 1600 have been found to be either difficult or practically impossible to disperse in water; on the other hand, the use of lower molecular weight polyethylene glycols, whilst producing modified resins which were more readily dispersible, yielded films which were tacky; when the disclosure of the prior specification was adapted to the case of oil-modified alkyd resins which had been copolymerized with styrene in accordance with the process of our own several prior patents, it was found that the modified resins thus obtained were particularly difficult to emulsify.

According to the present invention there is provided a process for the production of a water-dispersible alkyd resin which comprises forming a polyethylene glycol-modified alkyd resin by heating a reaction mixture comprising polyethylene glycol and a polycarboxylic acid to esterifying temperature together with a polyhydric alcohol and a drying oil or the fatty acids thereof; it will be appreciated that the proportions of the above-named reactants are so chosen that the total number of hydroxyl groups are substantially equivalent to the total number of carboxylic groups so as to produce a final reaction product of low acid value.

The invention includes the production of the modified oil-modified alkyd resins from the partial esters as is common in industry; furthermore, the drying oils, their fatty acids or the partial esters thereof with a polyhydric alcohol may also be reacted with a partially-condensed alkyd containing the polyethylene glycol in the molecule.

The process of the present invention is particularly suitable for the production of the oil modified alkyd resins containing copolymerized therewith substances such as styrene and it is a further feature of the invention that said reaction mixture also contains a monomeric substance copolymerizable with the drying oil fatty acid radicals in the reaction mixture; said copolymerizable monomer may be a vinyl aromatic hydrocarbon or a nuclear halogen substitution derivative thereof or it may be a derivative of acrylic or methacrylic acid (such as the esters or nitriles thereof) and includes the alkyl substituted styrenes such as vinyl toluene.

The process for producing the alkyd resin copolymers may alternatively involve the use of a drying oil or the fatty acids or the said partial esters thereof which have been previously copolymerized with the said monomeric copolymerizable substances and, further, the invention includes the subsequent reaction of the polyethylene glycol modified oil-modified alkyd resin with said copolymerizable monomers; thus the invention includes the copolymerization of the drying oil fatty acid radicals with the copolymerizable monomers before, during or after the esterification reaction.

We have found that in some cases the resin copolymers have improved film-forming properties as compared with the non-copolymerized resin in that a slight degree of after-tack is avoided; water-resistance of the films derived from the copolymerized resins is also superior.

Whilst not claiming to understand thoroughly the chemical and physical factors which play their part in this invention, it would seem the polyethylene glycol ingredient of the oil-modified alkyd resin is acting as a "built-in" stabilizer for the resin when it is dispersed in water. It has, in fact, been found by fractional precipitation and analysis of the fractions that the polyethylene glycol radical is present throughout the whole range of different molecular weight species. For dispersion in water, some resins coming within the scope of the invention, will emulsify readily without ammonia or amine; with other resins, neutralization may be used with advantage to assist dispersion. In other cases, best results will follow from the use of emulsifying agents. In no case is a protective colloid needed to stabilize the dispersion at room temperatures.

There is some advantage (particularly for making gloss paints) in dispersion without neutralisation since viscosities are noticeably lower at equal solids contents as compared with dispersion in ammoniacal solution. For a gloss paint, it is desirable to start with a reasonably high concentration of solids in the dispersion so that adequate hiding power can be obtained with the relatively low pigment loading employed; with flat paints this aspect is less important. It appears to be the case however that corrosion of cans may be somewhat greater at acid pH's and protective precautions may be necessary.

Whilst dispersions of the resins alone and of paints made from them may be quite stable and capable of dilution with water, we have found that for brush application to large areas or absorbent surfaces, ease of application may be improved by the incorporation of a solvent which is miscible with both the resin and water. Amongst the solvents which may be employed there may be mentioned n-propyl alcohol, hexylene glycol, ethylene glycol mono-ethyl and mono-butyl ethers and the acetates thereof, diethylene glycol mono- and di-ethyl and butyl ethers, ethylene glycol phenyl and benzyl ethers, diacetone alcohol and dimethoxytetraglycol.

The proportion of polyethylene glycol to be incorporated into the oil-modified alkyd resin in order to achieve a given degree of water dispersibility depends on the viscosity of the resin and also on the proportion of free hydroxyl groups and free carboxyl groups in the finished resin. The greater the proportion of unesterified hydroxyl groups (whether in the acid or alcohol radical of the resin), the less polyethylene glycol is required. However, we prefer to work with resins where esterification is substantially complete which means in Works' practice that the acid value may vary from 5 to 20 or even 25, and the OH content from 10 to 50 or even 60. With such resins, where the oil length may range from say 35% to 80%, the preferred proportion of polyethylene glycol is from 10% to 20%, based on the completed resin, but proportions outside these limits may be employed.

The molecular weight of the polyethylene glycol is important insofar as water-dispersibility and drying of films is concerned. Generally speaking, the lower molecular weight materials produce greater ease of dispersion than the higher molecular weight materials when used in equal proportions by weight in an otherwise similar alkyd resin, although this is partly due to the lower viscosity resin resulting. Conversely, however, the higher molecular weight polyethylene glycols give better film-drying characteristics. We prefer to use materials of molecular weights 1000-6000 typified by the proprietary products Carbowax 1000, 1500 and 4000. However, it may be found that in some alkyds, particularly the shorter oil modifications, lower molecular weight polyethylene glycols such as the proprietary products Carbowax 200, 380, 400 and 600 may be used. The incorporation of mixtures of various polyethylene glycols is also envisaged as being within the scope of the invention.

The following examples will serve to illustrate the manner in which the invention may be carried into effect:

EXAMPLE 1

A water-dispersible resin was prepared from the following ingredients:

| | Parts by weight |
|---|---|
| Phthalic anhydride | 496 |
| Pentaerythritol | 292 |
| Polyethylene glycol (average mol. wt.—600) | 180 |
| Linseed oil fatty acids | 642 |
| Alkali refined linseed oil | 450 |

The phthalic anhydride, pentaerythritol, polyethylene glycol and the linseed oil fatty acids were all heated together to a temperature of 430° F. over a period of 1¼ hours in a stainless steel vessel under an atmosphere of nitrogen. The alkali refined linseed oil was thereafter added and the temperature of the reaction mixture was raised to 460° F. in 15 minutes and the temperature was maintained at that figure for a further 4½ hours.

The product, on cooling, was a clear, viscous resin having an acid value of 16.

A gloss emulsion paint was prepared from the foregoing resin by the following procedure:

A white pigment paste was prepared by grinding in a ball mill for 24 hours, 240 parts by weight of rutile titanium dioxide, 10 parts by weight of a 20% by weight aqueous solution of a sodium alkyl sulphate (sold under the trade name "Comprox A" believed to be based largely on $C_{12}$ alcohol) and 150 parts by weight of water.

72 parts by weight of the resin prepared as described above were admixed with 1.44 parts by weight of a cobalt linoleate drier (containing 4% cobalt metal) and the mixture was added to a pigment paste dispersion consisting of 80 parts by weight of the above-described white pigment paste, 44 parts by weight of water and 2.5 parts by weight of aqueous ammonia (specific gravity 0.880).

The pigment paste dispersion was kept at a temperature of 50° C. and the resin-drier mixture was added thereto with a moderate speed mechanical stirring. The resin dispersed readily into the aqueous pigment composition yielding a homogeneous water-paint which, on application by brush, dried in from 6 to 8 hours to give a hard, glossy film.

EXAMPLE 2

A styrenated alkyd resin was prepared from the following ingredients:

| | Parts by weight |
|---|---|
| Phthalic anhydride | 248 |
| Pentaerythritol | 150 |
| Polyethylene glycol (average mol. wt.—1500) | 142 |
| Linseed oil fatty acids | 321 |
| Alkali refined linseed oil | 225 |
| Monomeric styrene | 104 |

The procedure was that the phthalic anhydride, pentaerythritol, polyethylene glycol, linseed oil fatty acids and the alkali refined linseed oil with 30 parts by weight of the monomeric styrene were mixed together in a 2-litre flask and heated to reflux, at a temperature of approximately 360° F. The flask was fitted with a mechanical stirrer, thermometer, water-separator and reflux condenser. The temperature of the reaction mixture was allowed to rise to 430° F. at which point the remaining 74 parts of monomeric styrene were slowly added at such a rate as to maintain refluxing at a temperature of 430° F.

When all of the styrene had been added, the temperature of the reaction mixture was slowly raised to 460° F. and held under reflux at that temperature for a total reaction time of 7½ hours; from time to time small additions of xylene were added during the latter stage of the reaction in order to maintain a sufficient rate of reflux to remove the water of esterification.

At the end of the reaction, xylene was removed by vacuum distillation and a pale, clear, viscous resin remained which had an acid value of 19.

The styrenated alkyd resin was made into a gloss emulsion paint in the following manner:

150 parts by weight of the alkyd resin prepared above were mixed with 50 parts by weight of ethylene glycol mono-ethyl ether and 3 parts by weight of a cobalt linoleate drier (containing 4% cobalt metal). The mixture was stirred into a pigment dispersion made from 165 parts by weight of the pigment paste described in Example 1 together with 150 parts by weight of water, 2.5 parts by weight of the solution of sodium alkyl sulphate (Comprox A) referred to in Example 1.

The resin and the pigment paste dispersion were each heated to 50° C. and the resin mixture was slowly added to the pigment dispersion whilst stirring mechanically at a moderate speed.

The resin dispersed readily in the aqueous pigment dispersion to produce a homogeneous, stable emulsion paint which, on application by brush, dried in from 5 to 6 hours to a hard, glossy film which was found to have water-resistance much superior to gloss emulsion paint at present available on the market.

EXAMPLE 3

A water-dispersible resin was prepared as follows:

| | Parts by weight |
|---|---|
| Phthalic anhydride | 237 |
| Pentaerythritol | 185 |
| Polyethylene glycol (average mol. wt.—1500) | 112 |
| Linseed oil fatty acids | 535 |
| Monomeric styrene | 112 |

The above ingredients were heated to reflux temperature (approximately 360° F.) in a 2-litre flask fitted with a mechanical stirrer, thermometer, water separator and reflux condenser. As the styrene polymerised, the reflux temperature was allowed to rise to 390° F. and was maintained at this temperature until the total reflux time was 12 hours. Towards the end of the reaction, it was necessary to add small quantities of xylene to ensure that the reflux rate was sufficient to remove the water of esterification. The xylene was removed by vacuum distillation to yield a pale, clear, viscous resin with an acid value of 18.

A gloss paint was made from the water-dispersible resin thus prepared as follows from the following ingredients:

| | | parts by weight |
|---|---|---|
| A | resin | 100 |
| | hexylene glycol | 24 |
| | drier (cobalt linoleate containing 4% cobalt) | 2 |
| | drier (a mixture of manganese and lead linoleates containing 1% manganese and 5% lead). | 2 |
| | 10% solution of Tergitol XC | 6 |
| B | water | 99 |
| C | titanium dioxide | 50 |
| | lithopone | 50 |

(The substance Tergitol XC is a mono-butyl ether of a polyethylene glycol of molecular weight 1400.)

Ingredients A were mixed and mechanically stirred until a clear solution was obtained which, on dilution with B, gave a homogeneous translucent dispersion. Pigments C were then added and the mixture was ground in ball-mill for 48 hours.

The resulting paint was found to dry to a hard film with excellent gloss.

A gloss white paint was made from the same water-dispersible resin as follows from the following ingredients:

| | Parts by weight |
|---|---|
| Resin | 400 |
| Ethylene glycol monobutyl ether | 40 |
| Drier (cobalt linoleate containing 4% cobalt) | 5 |
| Drier (lead linoleate containing 11% lead) | 18 |
| 10% solution of Tergitol XC | 24 |

The foregoing ingredients were mixed and were mechanically stirred until a clear solution was obtained.

At this point, 268 parts by weight of titanium di-oxide were added and the admixture of the resin solution and the pigment were then ground twice in a triple roll mill.

To the pigment dispersion thus obtained, which was in the form of a paste, 420 parts of water were added with stirring and it was found that the paste dispersed readily in the water and yielded a gloss emulsion paint which had good brushing characteristics and yielded films having an excellent gloss.

The drying properties of the film were similar to those obtained from the preceding gloss paint formulation and the present formulation illustrates the use of a much smaller quantity of solvent, namely the ethylene glycol mono-butyl ether, than was used in the foregoing formulation. It will be noted that the corresponding weight of the hexylene glycol of the preceding formulation would have been 96 parts by weight as compared with 40 parts by weight used in this formulation.

A flat white paint was made from the same water-dispersible resin as follows from the following ingredients:

| | | parts by weight |
|---|---|---|
| A | resin | 50 |
| | hexylene glycol | 12 |
| | morpholine | 2 |
| | drier (cobalt linoleate as above) | 1 |
| | drier (mixed manganese and lead linoleates as above). | 1 |
| | 10% solution of Tergitol XC | 3 |
| B | water | 90 |
| C | titanium dioxide | 133 |
| | china clay | 67 |
| D | water | 45 |

Ingredients A and B were mixed as described above to give a translucent dispersion. Pigments C were added and the thick paste so formed was ground twice on a triple roll-mill. The extra water D was then added to bring the paint to brushing viscosity. The resulting paint was found to dry to a hard opaque flat film with a slight sheen.

EXAMPLE 4

| | Parts by weight |
|---|---|
| Phthalic anhydride | 789 |
| Pentaerythritol | 450 |
| Polyethylene glycol (mol. wt.—1500) | 426 |
| Dehydrated castor fatty acids | 963 |
| Dehydrated castor oil | 675 |
| Methyl methacrylate | 100 |

The above ingredients were mixed together and were brought to reflux temperature (reflux starting at 295° F.) in a closed vessel equipped with dropping funnel, condenser, side arm water trap, agitator and means for admitting gases into the bottom of the vessel. The latter provides for inert gas above the reactants as well as means for blowing the reaction mass at the option of the operator. After reflux starts, water liberated is removed and collected in the side arm trap below the condenser. Solvents, for example toluene, may be added in addition for solvent cooking and to assist in water removal. The temperature increases as condensation of the reactants progresses. As the temperature of the reactants approaches 350° F. the reflux rate slows appreciably. 211 parts of methyl methacrylate in addition were weighed out and transferred to the dropping funnel and were added to the reaction mass over a time interval. One to three hours time interval of addition has been satisfactory.

In this example the refluxing and heating was continued to an acid value of 69 (mg. KOH per gram of resin solids) whereupon the heating was discontinued and the resinous content blown with inert gas to remove traces of unreacted monomer.

EXAMPLE 5

In the same equipment as described in Example 4, a water-dispersible vinyl-modified, oil-modified alkyd resin was produced as follows:

| | Parts by weight |
|---|---|
| Phthalic anhydride | 789 |
| Pentaerythritol | 450 |
| Polyethylene glycol (mol. wt.—1500) | 426 |
| Dehydrated castor fatty acids | 963 |
| Dehydrated castor oil | 675 |
| Acrylonitrile | 100 |

The above ingredients were mixed together and were brought to reflux at 242° F. The temperature increased with liberation of water and condensation of the reactants. At a temperature of about 325° F., 211 additional parts of acrylonitrile were weighed out and transferred to the dropping funnel. The additional vinyl monomer was then added to the hot reaction mass over a time interval, the temperature of the reactants falling as low as 222° F. The final cooking temperature was 400° F.

Cooking was continued to a cure value of 16 seconds (time to gelation of a thin film spread on a 200° C. hot plate) and an acid number of 25.

EXAMPLE 6

|  | Parts by weight |
|---|---|
| Phthalic anhydride | 789 |
| Pentaerythritol | 450 |
| Polypropylene glycol (mol. wt.—1025) | 710 |
| Dehydrated castor fatty acids | 963 |
| Dehydrated castor oil | 675 |
| Vinyl toluene | 100 |

The above ingredients were mixed together and were brought to reflux as in Examples 4 and 5. The temperature of the reaction mass was increased over a two-hour period from 346° F. to 424° F. Thereafter 211 parts vinyl toluene were transferred to the dropping funnel and added slowly over a one-hour interval holding the temperature at 420° F. After all the vinyl toluene had been added, the temperature was increased to 450° F. and held until an acid value of 28 and a cure of 29 seconds were obtained.

Each of the above materials, wherein a vinyl compound other than styrene was substituted for styrene, produced a water-dispersible coating useful in formulating pigmented coatings of both flat lustre as well as glossy surface. Paints made from these vehicles dried to form water-resistant films. The last example illustrates equivalence of polypropylene glycol to polyethylene glycol for the purposes of the invention.

EXAMPLE 7

Into a glass reaction vessel equipped with condenser, side arm watertrap, agitator and thermometer, were weighed the following:

|  | Parts by weight |
|---|---|
| Alkali refined soya bean oil | 1040 |
| Tung oil | 520 |
| Glycerine | 525 |
| Xylene | 166 |
| Litharge | 9 |

The temperature of the reactants was taken to 440° F. in approximately 1½ hours and held for 1 hour at this temperature to alcoholize the oils. Thereafter, there were added, over a 30-minute time interval, 1130 parts by weight phthalic anhydride. The temperature dropped to 320° and, on continued heating, 400° F. was regained. After approximately 5 hours the acid value of the alkyd was reduced to 33, and its viscosity K–L (Gardner-Holdt). Next day, upon heating up the reaction mixture, 809 parts by weight of equal parts of a mixture of polyethylene glycol of 300 and 1450 molecular weights, were added at 180° F. and an attempt made to gain a temperature of 420–430° F. In two hours, a temperature of 382° F. was gained at which time the cure of the resin fell to 25, viscosity to 42 minutes and an acid number of 21.

The foregoing experiment was carried out following the procedure of United States Patent No. 2,634,245 for purposes of comparison with the following procedure which is in accordance with the present invention.

In equipment identical to that used in the foregoing experiment and using identical quantities of identical materials, the procedure followed was to effect the alcoholysis reaction in the presence of the polyethylene glycol instead of reacting the polyethylene glycol with the completely-formed alkyd resin. The several ingredients were therefore weighed out into the reaction vessel and 450–460° F. was gained in 3 hours. The temperature was held for one hour for alcoholysis.

Thereafter, 1130 parts by weight of phthalic anhydride were added over a twenty-minute interval at which time the temperature fell to 340° F. and, on continued heating, 400–450° F. was regained. Temperatures within this cooking range were held for approximately three and one-half hours to produce a final resin having an acid value of 17.3, a cure of 124 seconds, and a viscosity of 27 minutes.

EXAMPLE 8

In this example an alkyd was prepared utilizing 284 parts by weight of the mixture of polyethylene glycols used in Example 7, 963 parts by weight dehydrated castor fatty acids, 675 parts by weight dehydrated castor oil, 789 parts by weight phthalic anhydride and 450 parts by weight pentaerythritol. The procedure followed was similar to that described in Example 7. The resulting alkyd had a cure of 25, an acid number of 37, and a viscosity of 18⅔ minutes.

EXAMPLE 9

The procedure was the same as Example 8 and with the same ingredients but containing, in addition, 311 parts by weight of vinyl toluene which copolymerized with the drying oil fatty acid radicles during the course of the alkyd-forming esterification reaction.

By way of comparison, an experiment was carried out using the same ingredients in the same amounts as above set out but varying the preparative procedure by adding the polyethylene glycols only after the esterification and copolymerisation reactions leading to polymer formation had been substantially completed in accordance with the teachings of United States Patent No. 2,634,245 and resulted in a product which had a cure of 25, an acid value of 33 and a viscosity (100% solids) of 41 minutes.

EXAMPLE 10

This example illustrates the process of the invention applied to an alkyd resin having an oil limit of 60% and utilizing a polyethylene glycol of considerably higher molecular weight.

The ingredients used were as follows:

|  | Parts by weight |
|---|---|
| Linseed oil fatty acids | 567 |
| Pentaerythritol | 182 |
| Polyethylene glycol (average molecular weight 6000) | 100 |
| Phthalic anhydride | 212 |

The foregoing ingredients were introduced into a 2-litre flask fitted with a mechanical stirrer, a thermometer, side arm watertrap and reflux condenser and the contents were heated.

Sufficient xylene was added to the reaction mixture to give a temperature of reflux of 200° C.

After refluxing for 9 hours at this temperature, 59 parts by weight of water have been evolved and removed from the water-trap and the acid value of the reaction mixture had fallen to 22.

At the conclusion of the reaction, the xylene was removed by vacuum distillation to yield a clear, viscose water-dispersible resin.

To establish the difference between the products of the present invention and those prepared in accordance with the teachings of the United States Patent No. 2,634,245, the products produced as described in the foregoing Examples 7, 8 and 9 and the two experiments set out in Examples 7 and 9 were used in preparing an emulsion enamel employing the following test formulation:

A mixture of 300 parts of titanium dioxide, 75 parts of talc and 250 parts of alkyl vehicle was in each case ground over a three roller mill to form an enamel. To this base was added: 3 parts by weight of cobalt naphthenate (containing 6% cobalt), 6 parts lead naphthenate (containing 24% lead) and 100 parts by weight of hexylene glycol and while agitating the mixture thus produced there was added 405 parts by weight of water and an amount of 13% by weight aqueous caustic soda to produce a final pH slightly below 7.

Results obtained from the series of five enamels are tabulated below:

*Table I*

| Enamel Identification | Remarks |
|---|---|
| Experiment from Example 7 | The product separated immediately and was so unstable that it was impossible to brush out for tests. |
| Example 7 | A rich creamy product having good brushing quality and excellent emulsion stability. |
| Example 8 | Good quality product very similar to Example 7. No great difference in quality of the product over that of Example 9 was apparent from immediate stests. |
| Example 9 | Similar results as to initial quality as Example 8. |
| Experiment from Example 9 | Initial appearance better than obtained with the alkyd from the experiment of Example 7, but the product was thin in body and broke depositing crescents typical of emulsion breakdown under the brush. Unstable emulsion. |

The results set out in the foregoing table in respect of the enamels produced from the experiments contained in Examples 7 and 9 indicate that the resin of those experiments has an entirely different quality and character from the resins produced by carrying out the process of the invention as illustrated in Examples 7, 8 and 9. It appears that the resin in the two experiments is a "block" type of copolymer in which the alkyd molecules form a chain linked together by esterification through the polyethylene glycol molecules. As has previously been pointed out, this is the product produced by following the process described in United States Patent No. 2,634,245 and, whilst such products appear to be emulsifiable in the presence of protective colloids, the properties of the emulsion are clearly entirely different from those obtainable in the case of the resins produced in accordance with the present invention in which, by reason of the polyethylene glycol being present during the alkyd-forming reaction, a heterogeneous molecule is produced in which the polyethylene glycol participates in the alkyd-forming reaction instead of functioning as linkages between pre-formed alkyd molecules. Of the enamels set out in the table, those derived from the use of the resin of Example 7 were particularly outstanding in quality, whilst the properties of the enamels produced from the resins of Examples 8 and 9, in the latter of which the resin was copolymerised with a vinyl toluene, exhibit no great difference, except that possibly the drying characteristics and water-resistance of the film produced from the formulation based on the resin of Example 9, exhibit an improvement over the comparable resin of Example 8 which was not modified by copolymerisation with vinyl toluene.

Reference has been made to the substantial equivalency between the total number of hydroxyl groups and the total number of carboxylic groups in the acidic and alcoholic constituents of the reaction mixture, but it is to be understood that some excess of hydroxyl groups in the alcoholic ingredients of the reaction may be employed as is common in the industrial production of alkyd resins, the excess being deliberately employed in order to assist in the production of resins having a lower acid valve.

Among the polyhydric alcohols which may be employed in the practice of the present invention, there may be mentioned, in addition to those most commonly used, namely glycerol and pentaerythritol, mannitol and sorbitol and, similarly, among the polybasic acids which may be employed instead of the commonly-used phthalic acid or anhydride there may be mentioned terephthalic acid, succinic and glutaric acids but, in both instances, it is to be understood that the polybasic acid and polyhydric alcohol ingredients are not limited to those specifically exemplified or mentioned and that any polybasic acid or polyhydric alcohol which is suitable for use in the manufacture of an alkyd resin may be employed without substantial variation in the above-described procedures for carrying the invention into effect.

Among the monomeric substances copolymerisable with the drying oil fatty acid radicles which may be employed in the practice of the present invention, there may be mentioned, in addition to the monomers specifically exemplified above, alphamethyl styrene, the nuclear alkyl substituted styrenes, such as vinyl toluene (ortho-, meta- and para-) vinyl naphthalene and acenaphthylene, the nuclear halogen substituted styrenes, such as para-chloro- and para-fluoro-styrene, chloromethyl styrene and including the di-ortho-chlorostyrene, vinyl esters, such as vinyl acetate and the alkyl esters of acrylic, methacrylic and chloroacrylic acids and the nitriles of those acids. Indeed, any unsaturated monomeric substance which is suitable for use in the copolymerization reaction may be employed as will be apparent to anyone skilled in the art.

Among the drying oil fatty acid radicles which may be present in the oil-modified alkyd resins, are the commonly employed linseed, tung, oiticica and dehydrated caster oil fatty acids and, in addition to these, there may be used the fatty acids of cottonseed, soyabean, perilla, sesame, peanut, sunflower seed, poppy seed, hempseed oils and various other vegetable and marine oils and, indeed, any oils which yield unsaturated drying or semi-drying fatty acids may be employed as will be apparent to anyone skilled in the art.

In general, therefore, it is to be understood that the invention is to be constructed broadly as consisting in the production of an oil-modified alkyd resin with the use of a polyoxyalkylene glycol, preferably polyethylene glycol, during the alkyd-forming esterification reaction so that the polyethylene glycol is incorporated into the alkyd molecule and any and all variants in the art of alkyd resins are envisaged as being within the ambit of the present invention.

The elimination of the need for the use of emulsifying agents and stabilizers renders the production of protective and decorative coatings, including the glossy emulsion paints, more economical and less complex to formulate; moreover, although we have referred to a substantial equivalency of hydroxyl and acid groups, the customary excess of hydroxyl groups which is common practice in the alkyd art, may be employed.

Although in the foregoing discussion reference has principally been made to the use of polyethylene glycol, it is to be understood that the invention embraces the use of polyoxyalkylene glycols generally, although the preferred compound is polyethylene glycol. With regard to the copolymerizable substances, we prefer to use monomeric vinyl compounds which contain a single centre of unsaturation and it will further be understood that throughout the specification, references to polybasic acids are intended to refer to compounds containing a plurality of carboxylic groups and principally has reference to dicarboxylic acids.

What we claim is:

1. A process for the production of a water-dispersible drying oil modified alkyd resin which is emulsifiable in water without further addition of surfactants to form emulsion coating compositions characterized by their emulsion stability in the absence of protective colloids which comprises reacting at temperatures above about 350° F. but below about 600° F. a mixture comprising about 35 to not more than about 80% by weight of the total reactants of a drying oil fatty acid radical containing alkyd modifying agent selected from the group consisting of drying oil fatty acids, drying oil fatty acid monoglycerides, drying oil fatty acid diglycerides, drying oil fatty acid triglycerides and the drying oil fatty acid total and partial esters of equivalent polyfunctional polyols; an alkyd-forming organic dicarboxylic acid selected from the group consisting of single ring containing aromatic dicarboxylic acids and difunctional aliphatic dicarboxylic acids; a combination of at least two different alkyd-forming polyols in an amount such that the reactive hydroxyl groups available from said polyol combination are at least stoichiometrically equivalent to the free acid groups present in the reaction mass, at least one of said polyols an alkyd-forming monomeric polyol containing a number from three to not more than six hydroxyl groups, said hydroxyl groups containing the sole oxygen atom in said polyol and a second essential polymeric polyol which contains a plurality of repeating ether oxygen atoms in the monomeric groups of said polymeric chain and which is a dihydric alcohol containing at least four oxyalkylene groups wherein said oxyalkylene groups contain at least two but not more than three carbon atoms in a hydrocarbon chain unit and which polymeric polyol has a molecular weight in excess of 300 but not in excess of 6000 and which polyol constitutes a quantity of at least 10% by weight of the alkyd-forming reactants; and continuing the esterification under the conditions stated to form a polymeric product having repeating polymeric units in the polymer; said polymeric units repeated in said polymer having the second polymeric polyol ester residue interspersed in the final polymeric product, said final product having a hydroxyl value of not more than about 60 nor less than about 10, and having an acid value of less than about 75 but not less than about 5.

2. The product of the process of claim 1.

3. The process of claim 1, wherein the drying oil fatty acid reactant thereof is reacted with a monomeric vinyl compound selected from the group consisting of aromatic vinyl compounds including styrene and its equivalents and aliphatic vinyl compounds including methyl methacrylate and its equivalents.

4. The product of the process of claim 3.

5. An oil-in-water emulsion coating composition containing the product of the process of claim 1 dispersed as a substantially stable emulsion in an aqueous medium with at least one finely divided pigment dispersed in said emulsion system.

6. The process of claim 1, wherein the second polymeric polyol has a molecular weight between 1,000 and 4,000.

7. The process of claim 1, wherein the second polymeric polyol is polyoxyethylene glycol.

8. The process of claim 1, wherein the second polymeric polyol is polyoxypropylene glycol.

9. The process of claim 3, wherein the aromatic vinyl compound is styrene.

10. The process of claim 3, wherein the aromatic vinyl compound is vinyl toluene.

11. The process of claim 3, wherein the aliphatic vinyl compound is methyl methacrylate.

12. A water-reducible pigmented protective coating composition containing as the principal vehicle binder component the product of the process of claim 1 in the discontinuous state in said composition.

References Cited in the file of this patent

UNITED STATES PATENTS

| | | |
|---|---|---|
| 2,155,639 | Bradley | Apr. 25, 1939 |
| 2,166,542 | Bradley | July 18, 1939 |
| 2,634,245 | Arndt | Apr. 7, 1953 |
| 2,919,253 | Hart | Dec. 29, 1959 |
| 2,919,254 | Christenson | Dec. 29, 1959 |

FOREIGN PATENTS

| | | |
|---|---|---|
| 629,490 | Great Britain | Sept. 21, 1949 |